United States Patent
Rickley et al.

[11] 3,782,796
[45] Jan. 1, 1974

[54] RETAINING MEANS FOR A BEARING ASSEMBLY

[75] Inventors: Samuel S. Rickley, West Boylston; Harry Boghosian, Worcester, both of Mass.

[73] Assignee: Morgan Construction Company, Worcester, Mass.

[22] Filed: Dec. 18, 1972

[21] Appl. No.: 315,839

[52] U.S. Cl. ............................................ 308/234
[51] Int. Cl. ........................................... F16c 19/14
[58] Field of Search ................... 308/236, 230, 207, 308/234

[56] References Cited
UNITED STATES PATENTS
3,080,199   3/1963   Rickley ......................... 308/207 R

*Primary Examiner*—Charles J. Myhre
*Assistant Examiner*—Frank Susko
*Attorney*—C. Yardley Chittick et al.

[57] ABSTRACT

For use with a rotatable element having one section journalled for rotation in a bearing assembly and having another section protruding axially beyond the said one section, an arrangement for retaining the bearing assembly on the said one section including a threaded ring axially movable on and held by means of a key against rotation relative to the said other section, a stop member removably mounted on the said other section for limiting movement of the threaded ring away from the bearing assembly; a nut member threaded on the ring and rotatable to a position contacting the bearing assembly to thus seat the bearing assembly and thereafter exert a retaining force thereon and a locking member removably attached to the nut member and cooperatively engaged with the key for preventing rotation of the nut relative to the threaded ring once the bearing assembly is properly seated.

7 Claims, 3 Drawing Figures

RETAINING MEANS FOR A BEARING ASSEMBLY

DESCRIPTION OF THE INVENTION

This invention relates generally to rotatable elements journalled for rotation in bearing assemblies and more particularly to means for retaining the bearing assemblies on the rotatable elements.

The invention will hereinafter be described in connection with bearing assemblies for rolls in a rolling mill. It will be understood, however, that this application of the invention to a particular use is employed herein only for illustrative purposes, and is not intended nor should it be construed as a limitation upon the scope of the invention as it may be applied to other similar uses.

One object of the invention is to provide an improved means for retaining a bearing assembly on one end of a rotatable element, typically the neck portion of a work roll or back-up roll in a rolling mill. A related object of the invention is to provide a bearing retaining means which is more rugged in construction than those heretofore employed, and which is thus less likely to fail during subsequent operation.

Another object of the invention is the provision of a bearing retaining means which can only be rendered completely operative after the bearing assembly has been properly seated, thus precluding the possibility of the rotatable element being placed in service until it is properly journalled within the bearing assembly.

A still further object of the present invention is the provision of a bearing retaining means which is less complicated in construction and thus less expensive to manufacture than those heretofore employed.

These and other objects and advantages of the present invention will become more apparent as the description proceeds with the aid of the accompanying drawings wherein.

Figure 1:
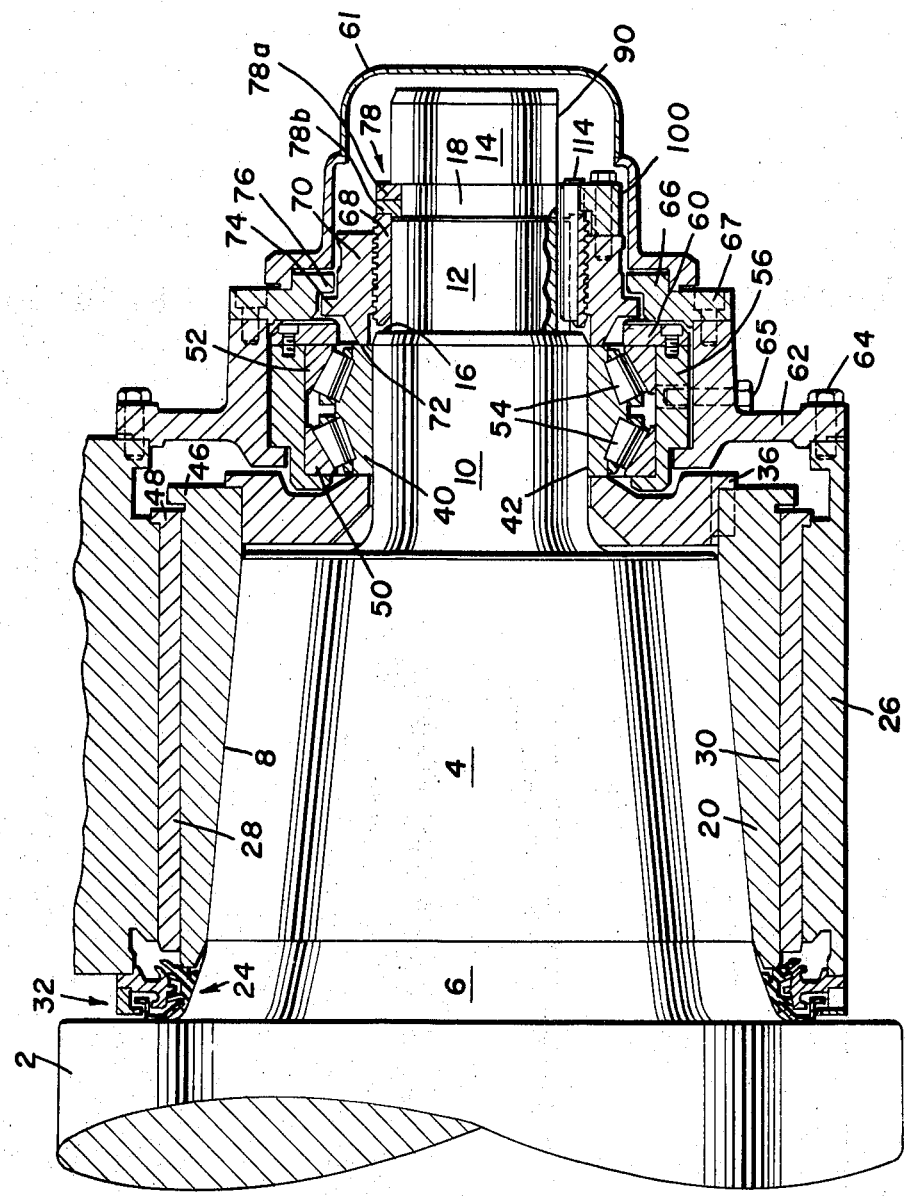
FIG. 1 is a vertical sectional view of a bearing assembly with a retaining means embodying the concepts of the present invention.

Referring now to the drawings, one end of a roll 2 is shown from which extends a roll neck 4 having a transition portion 6. The outer surface 8 of the roll neck 4 is tapered in the form of a truncated cone. Extending from the roll neck 4 is an extension 10 which continues outwardly away from the roll with an integral portion 12 of somewhat less diameter. The extension has a terminal end 14 slightly smaller in diameter than extension 12 to facilitate mounting and dismounting of the bearing assembly and its retainer means. Between extension portions 10 and 12 is a circular shoulder 16. Extensions 10 and 12 are cylindrical and coaxial. Between extension 12 and end 14 is a circumferential groove 18 coaxial with the extensions.

In the drawings, the bearing and its associated retainer means are shown mounted on the roll neck and extensions in the normal operating positions. The bearing comprises a sleeve 20 that fits exactly on roll neck surface 8. The sleeve is secured against rotation on the roll neck by a key (not shown) fitting in corresponding keyways in the sleeve and roll neck. At the inner end of the sleeve 20 is a neck seal 24 which is mounted on the transition portion 6 and which rotates with the sleeve. Surrounding the sleeve is a stationary chock 26 lined with a bushing 28. The interior of the bushing supports the sleeve along a bearing surface as at 30, with the cylindrical area therebetween filled with oil to provide the necessary anti-friction and load-carrying characteristics.

Affixed to the inner end of chock 26 is a circular element 32 designed to cooperate with the neck seal 24 so that cooling water used to cool the roll 2 and other foreign material cannot get into the bearing surface 30. Element 32 further assists in removal of seal 24 from the transition portion 6 of the roll neck when the bearing assembly is being removed from the roll neck.

At the outer end of sleeve 20 is a sleeve ring 34 which fits snugly within and has a flange 36 overlying the outer sleeve end. The sleeve ring 34 is keyed to the sleeve 20 by a key (not shown). Sleeve ring 34 is slidable on extension 10 and has its outer end abutting the end of inner race 40 of a thrust bearing generally referred to at 42. Sleeve 34 is keyed to inner race 40 by a key (not shown) residing in aligned keyways in the respective parts. From the structure described thus far, it will be seen that as roll neck 4 rotates, the sleeve 20, sleeve ring 34 and inner race 40 of the trust bearing 42 are compelled to rotate therewith.

Figure 2:
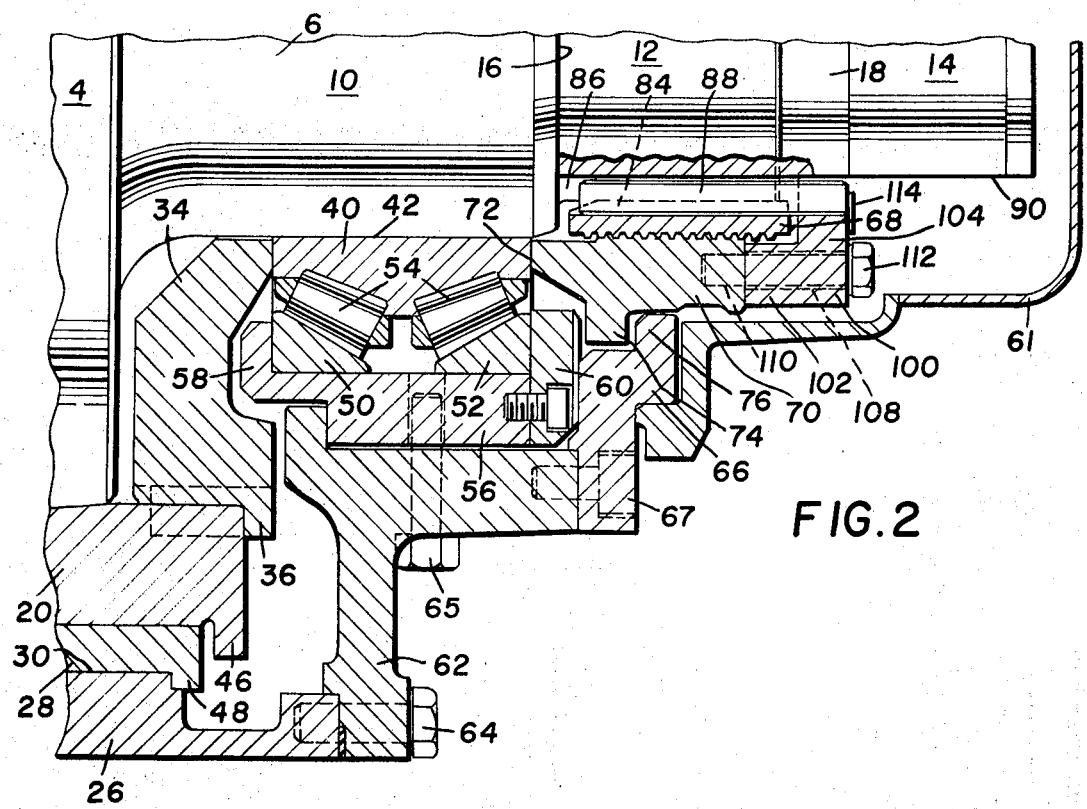
FIG. 2 is an enlarged sectional view of a portion of the apparatus shown in FIG. 1; and, FIG. 3 is an end view of the bearing assembly shown in FIGS. 1 and 2 with the end cover removed and with portions of the roll end broken away.

The outer end of sleeve 20 has a radially extending circumferential flange 46 of such dimension as to overlap the outer end of bushing 28. Similarly, bushing 28 has an outwardly extending circumferential flange 48 which overlaps a portion of the outer end of chock 26. Thus it can be seen that if the chock 26 and bushing 28 are moved to the right with respect to sleeve 20, as viewed in FIGS. 1 and 2, the bushing will promptly make engagement with the flange 46.

The thrust bearing 42 comprises the following elements:

an inner race 40 already referred to; two separate outer races 50 and 52; and a plurality of roller bearing therebetween indicated at 54. The outer races 50 and 52 are held in position by a surrounding roller bearing housing 56 which has an inwardly turned flange 58 on its inner end and a bolted-on roller bearing end plate 60 on its outer end.

The sleeve 20 and thrust bearing 42 are enclosed in a water-tight structure which comprises the chock 26 and a chock end plate 62 which is bolted to the outer end of the chock by a plurality of cap screws 64. To the other end of chock end plate 62 is connected an outer end plate 66 by a plurality of cap screws 67. An oil pipe 65 for feeding oil to the thrust bearing 42 runs through the chock end plate 62 and the roller bearing housing 56. An end cover 61 is attached to the outer end plate 66 to complete the bearing enclosure.

The bearing assembly described above is for the most part already known to those skilled in the art, as evidenced by the disclosure in U. S. Pat. No. 3,080,199, which is assigned to the same assignee as that of the present application. What is new, however, is the improved retaining means for maintaining the bearing assembly on the roll shaft and its extensions. The following discussion will focus on this improvement.

A one-piece threaded ring 68 is mounted for limited axial movement on the extension 12. The length of the ring is slightly less than the distance between shoulder 16 and the inner edge of groove 18. A nut member 70 is threaded on the ring 68. The nut member has an inner circular abutment 72 adapted to engage the inner race 40 of the thrust bearing 42. The nut 70 is also provided with an outwardly extending flange 74 which is positioned between the roller bearing retainer 60 and an inwardly turned flange 76 on the outer end plate 66.

Figure 3:
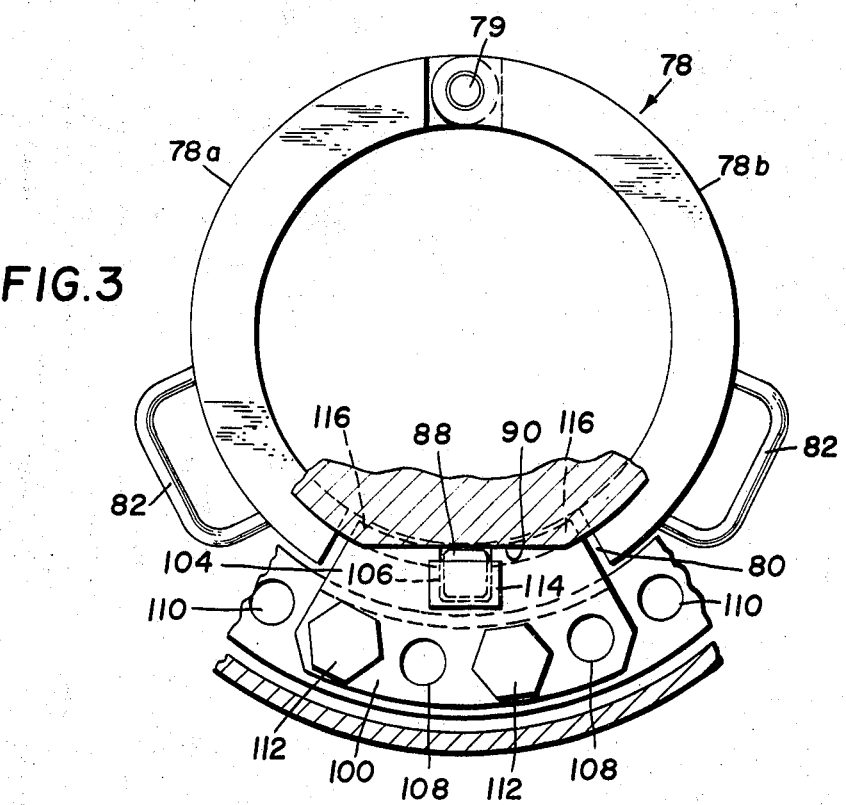

In order to limit movement of the threaded ring 68 on extension 12 in a direction away from the thrust bearing assembly 42, there is provided a stop means in the form of a clamp ring 78. As is best shown in FIG. 3, the clamp ring 78 has two generally semi-circular sections 78a and 78b which are hinged as at 79 by a single hinge pin. The clamp ring, when in its operative position, is seated in the groove 18 and its dimensions are such that there is no end play within the groove. The lower ends of the two clamp ring halves 78a and 78b are spaced to provide a generally arcuate space 80. The clamp ring halves 78a and 78b are each provided with handles 82 which facilitate mounting and removal of the clamp ring 78.

During initial installation, the threaded ring 68 with nut member 70 in place is mounted on the integral portion 12. The nut member 70 remains assembled on and integral with the threaded ring 68 while the bearing is in operation, as well as during assembly and disassembly of the bearing components. The threaded ring 68 has a keyway 84 which is aligned with a keyway 86 in portion 12 to accept a key 88. The key 88 is completely separate from the clamp ring 78. The underside of the terminal end 14 has been cut away to produce a flat area 90 which runs from the end of the roll shaft to the groove 18 and which enables the key 88 to be slid into its operative position as shown in the drawings, thereby preventing rotation of threaded ring 68 relative to portion 12.

With the key 88 and clamp ring 78 in place, the nut member is then tightened (clockwise rotation as viewed in FIG. 3). The circular abutment 72 of the nut member 70 contacts the inner race 40 of the thrust bearing 42 and when this occurs, the threaded ring is pushed to the right as viewed in FIGS. 1 and 2 until it contacts the clamp ring 78. Once this takes place, the threaded ring 68 provides a fixed member on extension 12 about which the nut member 70 can be further rotated to provide a compressive force acting through inner race 40, sleeve ring 34 and the flange 36 to drive sleeve 20 to a properly seated position on roll neck 4. By providing sufficient rotative force on the nut member 70, the sleeve 20 can be positioned as tightly as necessary on the roll neck 4.

Conversely, it might also be appropriate to mention at this time that if nut member 70 is rotated in the opposite counter clockwise direction, its flange 74 will come into engagement with flange 76 of the outer end plate 66. As counter clockwise rotation of nut 70 is continued, the threaded ring 68 will move to the left until it contacts shoulder 16. Thereafter, as nut 70 is rotated further, tension forces will be set up in the outer end plate 66, the chock end plate 62 and chock 26, causing the chock to shift to the right until the flange 48 on bushing 28 engages flange 46 on the right hand end of sleeve 20. Continued counter clockwise rotation of the nut member 70 will thereafter cause dislodgement of sleeve 20 from its tight position on roll neck 4.

The general configuration of the threaded ring 68 and nut member 70 and their operation in conjunction with the other components as described above is also known to those skilled in the art, as evidenced by the disclosure in U.S. Pat. No. 3,080,199. The improvement of this invention lies in part in the provision of a key 88 which is separate from the clamp ring 78, and further in the provision of a separate locking member 100 which will now be described in further detail. When viewed in cross section, the locking member 100 has a generally L-shaped configuration, with an inwardly extending arcuate flange 102 which abuts the outer end of the nut member 70, and another radially inwardly extending arcuate flange 104 which has a notch 106 therein permitting the flange 104 to straddle the key 88 in interlocked engagement therewith. The locking member 100 has holes indicated typically at 108 which may be aligned with threaded holes 110 in the nut member 70 to accept bolts 112. The locking member 100 is further provided with a welded-on retaining plate 114 which overlaps the outer end of notch 106 and thus serves to axially retain the key 88 in place.

As is best shown in FIG. 3, when the locking member 100 is operatively positioned, its arcuate flange 104 is seated in groove 18. The corners 116 of flange 104 protrude above the flat area 90 and are thus partially overlapped by the outer wall of the groove 18. This relationship can only be established when the bearing components have been properly seated on the roll neck and its extensions by a sufficient tightening of the nut member 70. In other words, until the corners 116 of the locking member 100 can be seated in and overlapped by the outer wall of groove 18, the bearing will not be placed in operation, thus providing a final positive check which precludes operating the bearing without all of the components being properly seated. The locking member 100 in cooperation with the bolts 112 further provides a rugged mechanical interlock between the key 88 and the nut member 70 which retains the latter in position throughout operation of the bearing. The bolts 112 are subjected only to shear forces and not to bending and thus are less likely to fail. Since the key 88 is an independent piece which is separate from the clamp ring 78, it is not subjected to direct turning or twisting action and is less prone to cause damage to adjacent parts.

In light of the foregoing, it will now be appreciated by those skilled in the art that the bearing retaining means of the present invention is not necessarily limited to rolling mill uses, and that the same or similar arrangements may be employed in other areas wherever bearing assemblies are to be retained on rotatable elements. It is, accordingly, our intention to cover all changes and modifications of the embodiment herein chosen for purposes of disclosure which do not depart from the spirit and scope of the invention.

We claim:

1. In combination with a rotatable element having one section journalled for rotation in a bearing, and having another section extending axially beyond said one section, means cooperating with said other section for retaining said bearing on said one section, said means comprising: an externally threaded ring member mounted on and movable axially relative to said other section, a key operatively positioned between said other section and said ring member for preventing rotation of said ring member relative to said other section, a nut member threaded on said ring member, stop means removably mounted on said other section for limiting movement of said ring member away from said bearing, whereupon rotation of said nut member in one direction relative to said ring member will result in said nut member contacting said bearing to exert a retaining force thereon, and locking means removably attached to said nut member, said locking means cooperating with said key to prevent rotation of said nut member relative to said ring member.

2. The apparatus as claimed in claim 1 further characterized by the said other section of said rotatable element having a circumferential groove in the surface thereof, with said stop means comprising a split ring seated in said groove.

3. The apparatus as claimed in claim 2 wherein said locking means is seated in and partially overlapped by one of the side walls of said groove.

4. The apparatus as claimed in claim 2 wherein said locking means is comprised of an arcuate member having a generally L-shaped cross section with a first arcuate flange abutting said nut member and a second radially inwardly extending arcuate flange protruding into said groove, said second flange being notched to accept said key and having its corners overlapped by the outer wall of said groove, and bolt means securing said first flange to said nut member.

5. The apparatus as claimed in claim 4 further characterized by a retaining plate overlapping the notch on said second flange to thereby retain said key against axial withdrawal from its operative position between said other section and said ring member.

6. In combination with a rotatable element having a neck section journalled for rotation in a bearing and an axial extension on said neck section means cooperating with said axial extension for axially retaining said bearing on said neck section, said means comprising: an externally threaded ring mounted on said axial extension and movable axially relatively thereto, said ring having a keyway cooperating with a keyway on said axial extension to receive a key which prevents rotation of said threaded ring relative to said axial extension, a nut member threaded on said ring, stop means removably mounted on said axial extension adjacent to one end of said threaded ring, said stop means being operative to limit axial movement of said threaded ring along said axial direction away from said neck section, whereupon rotation of said nut in one direction relative to said ring will result in said nut exerting a retaining force on said bearing, and locking means for preventing rotation of said nut relative to said threaded ring, said locking means having a first flange removably attached to said nut and a second radially extending flange straddling said key.

7. Means for axially retaining a bearing in tight engagement on a roll neck, said means comprising: a roll extension integral with and extending axially from the roll neck, an externally threaded ring mounted on said extension for axial movement thereon, a key operatively positioned in oppositely disposed keyways in said ring and said roll extension for preventing relative rotation therebetween, a nut threaded into said ring, stop means removably mounted on said roll extension for limiting axial movement of said ring away from the roll neck, whereupon rotation of said nut in one direction relative to said ring will cause said nut to contact the bearing and exert a retaining force thereon, a groove in said roll extension adjacent to the distal end thereof, and locking means seated in said groove in interlocked engagement with said key for preventing rotation of said nut relative to said threaded ring.

* * * * *